(12) United States Patent
Che et al.

(10) Patent No.: US 11,641,591 B2
(45) Date of Patent: May 2, 2023

(54) OPTIMIZATION METHOD FOR UAV-BASED WIRELESS INFORMATION AND ENERGY TRANSMISSION

(71) Applicant: SHENZHEN UNIVERSITY, Shenzhen (CN)

(72) Inventors: Yueling Che, Shenzhen (CN); Yabin Lai, Shenzhen (CN); Sheng Luo, Shenzhen (CN); Jie Ouyang, Shenzhen (CN); Kaishun Wu, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 120 days.

(21) Appl. No.: 17/259,936

(22) PCT Filed: Oct. 16, 2018

(86) PCT No.: PCT/CN2018/110483
§ 371 (c)(1),
(2) Date: Jan. 13, 2021

(87) PCT Pub. No.: WO2020/015214
PCT Pub. Date: Jan. 23, 2020

(65) Prior Publication Data
US 2021/0297877 A1    Sep. 23, 2021

(30) Foreign Application Priority Data

Jul. 16, 2018 (CN) .......................... 201810774969.2

(51) Int. Cl.
*H04W 24/02* (2009.01)
*H02J 50/20* (2016.01)
(Continued)

(52) U.S. Cl.
CPC .......... *H04W 24/02* (2013.01); *B64C 39/024* (2013.01); *H02J 50/20* (2016.02);
(Continued)

(58) Field of Classification Search
CPC ..... H04W 24/02; H04B 7/18506; H02J 50/20
See application file for complete search history.

(56) References Cited

U.S. PATENT DOCUMENTS 9,421,869 B1 *  8/2016  Ananthanarayanan .. B64D 5/00
9,866,312 B2    1/2018  Jalali et al.
(Continued)

FOREIGN PATENT DOCUMENTS

CN    104201794 A    12/2014
CN    104333147 A    2/2015
(Continued)

OTHER PUBLICATIONS

English translation of CN104201794A (Year: 2014).*
(Continued)

*Primary Examiner* — Gennadiy Tsvey
(74) *Attorney, Agent, or Firm* — Bayramoglu Law Offices LLC (57) ABSTRACT

An optimization method for UAV-based wireless information and energy transmission includes following steps: S1: reporting, by a wireless device, an energy state of the wireless device to a UAV; S2: detecting, by the UAV, a channel state between the UAV and the wireless device; and S3: selecting, by the UAV, an optimal action based on estimated revenue maximization according to an electric quantity of the UAV, an electric quantity of the wireless device, and the channel state. The use of the wireless device can reduce wiring costs, beautify the space, and ensure a smaller size and a lower power. By applying the UAV to information and energy transmission for the wireless devices, the data transmission rate and the energy conversion efficiency of networks are improved.

9 Claims, 4 Drawing Sheets

(51) Int. Cl.
*H04B 7/185* (2006.01)
*B64C 39/02* (2023.01)
*H04W 24/10* (2009.01)
*B64U 10/13* (2023.01)
*B64U 101/00* (2023.01)

(52) U.S. Cl.
CPC ........ *H04B 7/18506* (2013.01); *H04W 24/10* (2013.01); *B64U 10/13* (2023.01); *B64U 2101/00* (2023.01)

(56) References Cited

U.S. PATENT DOCUMENTS

| | | | | |
|---|---|---|---|---|
| 9,944,191 | B2* | 4/2018 | Kim | B60L 53/12 |
| 2015/0281807 | A1* | 10/2015 | Pan | H04B 17/27 340/870.02 |
| 2016/0232627 | A1 | 8/2016 | Smith et al. | |
| 2016/0376031 | A1* | 12/2016 | Michalski | G05D 1/0676 701/15 |
| 2017/0063431 | A1* | 3/2017 | Milne | H04B 5/0037 |
| 2019/0044392 | A1* | 2/2019 | Chowdhury | H02J 50/12 |
| 2021/0013750 | A1* | 1/2021 | Kronander | H02J 50/90 |
| 2021/0039781 | A1* | 2/2021 | Yao | B64C 39/024 |

FOREIGN PATENT DOCUMENTS

| | | |
|---|---|---|
| CN | 105071852 A | 11/2015 |
| CN | 107707031 A | 2/2018 |
| CN | 107887943 A | 4/2018 |
| CN | 108243431 A | 7/2018 |

OTHER PUBLICATIONS

Pratibha, et al., Dynamic Cooperative Sensing-Access Policy for Energy-Harvesting Cognitive Radio Systems, IEEE Transactions on Vehicular Technology, 2016, pp. 10137-10141, vol. 65, Issue: 12.

Xiao Lu, et al., Dynamic Spectrum Access in Cognitive Radio Networks with RF Energy Harvesting, IEEE Wireless Communications, Jun. 2014, pp. 102-110, vol. 21, Issue: 3.

Jie Xu, et al., UAV-Enabled Multiuser Wireless Power Transfer: Trajectory Design and Energy Optimization, in Proc. IEEE APCC, 2017, pp. 764-769.

Jie Xu, et al., UAV-Enabled Wireless Power Transfer: Trajectory Design and Energy Region Characterization, 2017.

Arvind Merwaday, et al., UAV Assisted Heterogeneous Networks for Public Safety Communications, in Proc. IEEE Wireless Commun. Netw. Conf., 2015, pp. 329-334.

Kong Zeng, et al., Throughput Maximization for UAV-Enabled Mobile Relaying Systems, IEEE Transactions on Communications, 2016, pp. 4983-4996, 64(12).

Xuanke He, et al., A Drone-Based Wireless Power Transfer and Communications Platform, in Proc. WPTC, 2017.

\* cited by examiner

OPTIMIZATION METHOD FOR UAV-BASED WIRELESS INFORMATION AND ENERGY TRANSMISSION

CROSS REFERENCE TO THE RELATED APPLICATIONS

This application is the national phase entry of International Application No. PCT/CN2018/110483, filed on Oct. 16, 2018, which is based upon and claims priority to Chinese Patent Application No. 201810774969.2, filed on Jul. 16, 2018, the entire contents of which are incorporated herein by reference.

TECHNICAL FIELD

The present disclosure relates to the field of improved energy balancing distribution technologies, and more particularly, to an optimization method for UAV-based wireless information and energy transmission.

BACKGROUND

Abbreviated as an unmanned aerial vehicle (UAV), a pilotless aircraft is an unmanned aircraft based on wireless remote control and can also be programmed to achieve automatic flight. In recent years, related technologies of the UAV have become more and more mature, playing an important role in the field of wireless communication and wireless charging. The reason why the UAV can play an important role in the field of wireless communication and wireless charging is that the UAV can flexibly move and can be easily arranged wherever needed. Furthermore, due to proximity to a communication objective, a better communication environment can be obtained, and thus the data transmission rate and the energy transmission efficiency may be improved.

In China, with the popularization of the Internet of Things, more and more wireless devices are used in industry and daily life, such as smart factories and smart homes. The use of the wireless devices can save wiring costs and beautify space. However, numerous wireless devices such as sensors in the Internet of Things are smaller in size and lower in power. Costs of recycling, charging, and rearranging these wireless devices are high. Charging the wireless devices by using traditional wireless charging technologies often faces the problem that it is difficult to arrange charging base stations nearby. In addition, improving the data transmission rate is also one of the objectives of optimizing the Internet of Things. Therefore, how to use the UAV in information and energy transmission of the wireless devices and improve the data transmission rate and the energy conversion efficiency of the network is a practical research topic.

References [1] and [2] both propose the use of microwave wireless charging technologies in cognitive radio networks to improve spectrum utilization and solve the charging problem of the wireless devices. However, the charging base stations used are fixed on the ground and thus cannot move flexibly. Sometimes, it is difficult to arrange the charging base stations nearby the wireless devices. In References [3] and [4], by designing a flight trajectory of the UAV, energy received by the wireless device is maximized. In Reference [5], it is proposed that in the event of natural disasters or malicious attacks on the network, the UAV may be employed to quickly deploy the air communication base stations. The UAV may also participate in the formation of a mobile relay system. In Reference [6], by adjusting the transmission power and path planning, the throughput of the network is maximized. In Reference [7], the UAV may be employed to simultaneously transmit information and energy to the wireless devices. In the above references, either the UAV is not employed to transmit energy, or the UAV is only employed to transmit energy or information. In Reference [7], when the UAV is employed to transmit information and energy, both the energy and the information are incorporated into the same signal. After the wireless device receives the signal, a part of the signal is decoded, and a part of the signal is directly converted into energy. In the system considered, the UAV serves the wireless devices in the form of time division multiplexing, and selects to keep silence, transmit energy or information at each moment. Furthermore, an impact of a hovering height of the UAV on the system data rate may be finally considered.

REFERENCES

[1] Pratibha, Kwok Hung Li, and Kah Chan The, "Dynamic Cooperative Sensing—Access Policy for Energy-Harvesting Cognitive Radio Systems," IEEE Transactions on Vehicular Technology, Volume: 65, Issue: 12, December 2016, pp. 10137-10141.

[2] Xiao Lu, Ping Wang, Dusit Niyato, and Ekram Hossain, "Dynamic Spectrum Access in Cognitive Radio Networks with RF Energy Harvesting," IEEE Wireless Communications, Volume: 21, Issue: 3, June. 2014, pp. 102-110.

[3] Jie Xu, Yong Zeng and Rui Zhang, "UAV-enabled multiuser wireless power transfer: Trajectory design and energy optimization," in Proc. IEEE APCC

[4] Jie Xu, Yong Zeng and Rui Zhang, "UAV-Enabled Wireless Power Transfer: Trajectory Design and Energy Region Characterization," (available on-line at https://arxiv.org/abs/1706.07010).

[5] A. Merwaday and I. Guvenc, "UAV assisted heterogeneous networks for public safety communications," in Proc. IEEE Wireless Commun. Netw. Conf., pp. 329334, 9-12 Mar. 2015.

[6] Y Zeng, R. Zhang, and T. J. Lim, "Throughput maximization for UAV-enabled mobile relaying systems," IEEE Transactions on Communications, accepted (available on-line at arxiv/1604.02517).

[7] Xuanke He, Jo Bito and Manos M. Tentzeris, "A drone-based wireless power transfer anc communications platform," in Proc. WPTC

SUMMARY

An objective of the present disclosure is to provide an optimization method for UAV-based wireless information and energy transmission to solve the above technical problems.

The present disclosure is implemented as below. There is provided an optimization method for UAV-based wireless information and energy transmission, and the optimization method includes following steps.

S1: reporting, by a wireless device, an energy state $B(t)$ of the wireless device to a UAV;

S2: detecting, by the UAV, a channel state $\gamma(t)$ between the UAV and the wireless device; and S3: selecting, by the UAV, an action space based on estimated revenue maximization according to an electric quantity of the UAV, an electric quantity of the wireless device, and the channel state.

A further technical solution of the present disclosure is as below. The action space includes a silence state, and a state for charging the wireless device or a state for transmitting information to the wireless device.

A further technical solution of the present disclosure is as below. The energy state of the wireless device is classified into a scarcity state, a medium state, and a sufficiency state, respectively corresponding to $B(t)<E_d$, $E_d \leq B(t)<(1+T-t)E_d$, and $B(t) \leq (1+T-t)E_d$. When $B(t)<E_d$, the wireless device fails to decode, and the UAV does not transmit information to the wireless device. When $B(t) \geq (1+T-t)E_d$, the current electric quantity of the wireless device is enough to support decoding of all current and future time slots, and the UAV does not need to determine to charge the wireless device.

A further technical solution of the present disclosure is as below. The energy state of the UAV is classified into the scarcity state, the medium state, and the sufficiency state, respectively corresponding to $P_f \leq E_r(t)<2P_f$, $2P_f \leq E_r(t)<(1+T-t)P_f$, and $E_r(t) \geq (1+T-t)P_f$. When $P_f \leq E_r(t)<2P_f$, the UAV does not determine to charge the wireless device, otherwise the UAV can do nothing but only keep silence in subsequent time slots. When $E_r(t) \geq (1+T-t)P_f$, the current electric quantity of the UAV is enough to support information transmission in all current and future time slots, and the UAV does not need to determine to keep silence.

A further technical solution of the present disclosure is as below. The UAV needs to determine the action space in different states. When there is more than one action in the action space, a value needs to be calculated for each action, an action with a maximum value is selected, and the value of the action is defined as $Q_t(S(t), a(t)) \triangleq R_t(S(t), a(t)) + F_t(B(t+1), E_r(t+1))$. $F_t(B(t+1), E_r(t+1))$ represents an estimated future revenue after the time slot t. $Q_t$ represents a total revenue of instantaneous revenue plus the estimated future revenue corresponding to the action $a(t)$ in the state $S(t)$ $S(t)$ represents a system state of the time slot t, $a(t)$ represents the action of the time slot t, and $R_t$ represents the instantaneous revenue of the time slot t.

A further technical solution of the present disclosure is as below. When the electric quantity of the UAV is in different states, there are different calculation methods for the estimated future revenue, and the action of the time slot of the UAV is expressed as $$a(t) = \arg\max_{a_t} Q_t(S(t), a_t).$$

A further technical solution of the present disclosure is as below. When the UAV is in shortage of energy, $$F_t(B(t+1), E_r(t+1)) \triangleq \begin{cases} V_n, a(t) = 0 \\ 0, a(t) = 2 \end{cases},$$

wherein $V_n$ represents an expected revenue of a next time slot and is expressed as $$V_n = \log_2\left(1 + \frac{P_f E\{\gamma(t+1)\}}{P_0}\right);$$

wherein $V_n$ represents the expected revenue of the next time slot, $P_f$ represents a transmission power of the UAV, E represents a mathematical expectation symbol, $\gamma$ represents a channel state, and $P_0$ represents a noise power.

A further technical solution of the present disclosure is as below. When the UAV has a medium energy, it is estimated that the number of times the UAV will charge the wireless device in the future is $$n_c = \arg\min_n \left\| \left\lceil \frac{E_r(t+1)}{P_f} \right\rceil - n - \left\lfloor \frac{B(t+1) + nP_f E\{\gamma(t)\}}{E_d} \right\rfloor \right\|,$$

it is estimated that the number of times the UAV will transmit information to the wireless device in the future is $$n_m = \min\left\{ \left\lceil \frac{E_r(t+1)}{P_f} \right\rceil - n_c, \left\lfloor \frac{B(t+1) + n_c P_f E\{\gamma(t)\}}{E_d} \right\rfloor \right\},$$

and it is estimated that the future revenue is $$F_t(B(t+1), E_r(t+1)) \triangleq n_m \cdot \log_2\left(1 + \frac{P_f E\{\gamma(t)\}}{P_0}\right).$$

A further technical solution of the present disclosure is as below. When the UAV has sufficient energy, it is estimated that the number of times the UAV will charge the wireless device in the future is $$n_c = \arg\min_n \left\| \lceil T - t \rceil - n - \left\lfloor \frac{B(t+1) + nP_f E\{\gamma(t)\}}{E_d} \right\rfloor \right\|,$$

it is estimated that the number of times the UAV will transmit information to the wireless device is $$n_m = \min\left\{ \lceil T - t \rceil - n_c, \left\lfloor \frac{B(t+1) + n_c P_f E\{\gamma(t)\}}{E_d} \right\rfloor \right\},$$

and it is estimated that the future revenue is $$F_t\left(B(t+1), E_r(t+1)\right) \triangleq n_m \cdot \log_2\left(1 + \frac{P_f E\{\gamma(t)\}}{P_0}\right).$$

A further technical solution of the present disclosure is as below. A signal transmitted from the UAV to the wireless device is classified into a direct signal and an indirect signal according to different propagation paths.

Beneficial effects of the present disclosure are as below. The use of the wireless device can save wiring costs, beautify space, and ensure a smaller size and a lower power. The UAV is used in information and energy transmission for the wireless devices to improve the data transmission rate and the energy conversion efficiency of networks. This solution has a lower time complexity, but its effect is close to the God strategy with a high time complexity. Furthermore, the wireless device can be easily embedded into the UAV system, and higher data transmission rate and energy conversion efficiency can be achieved.

DETAILED DESCRIPTION OF THE EMBODIMENTS

Figure 1:
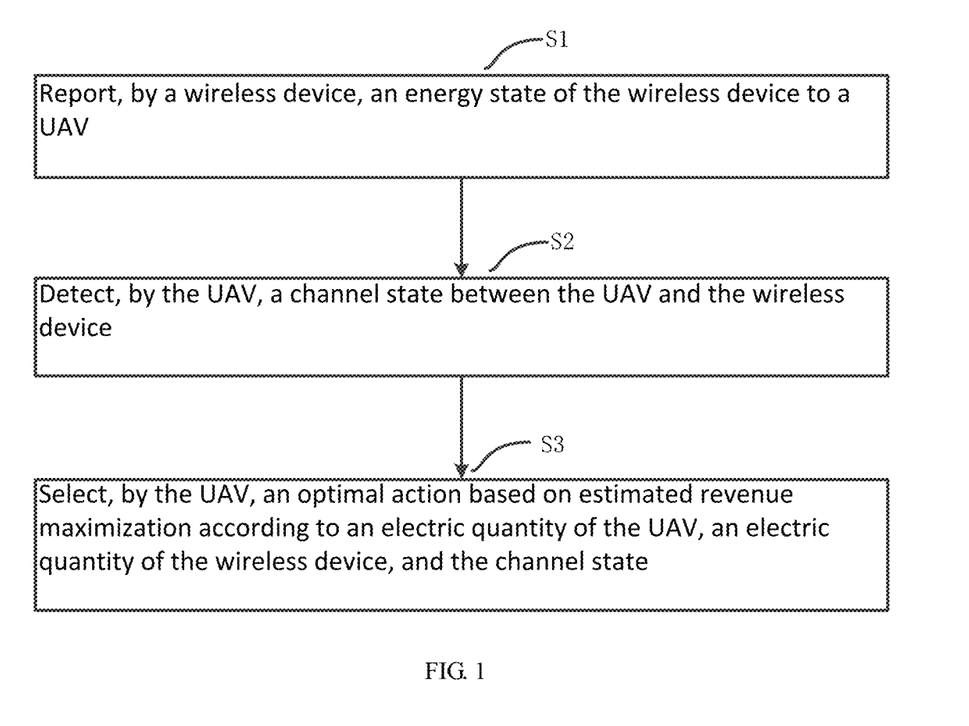
FIG. 1 is a flowchart of an optimization method for UAV-based wireless information and energy transmission according to an embodiment of the present disclosure.

As shown in FIG. 1, it is illustrated a flowchart of an optimization method for UAV-based wireless information and energy transmission according to an embodiment of the present disclosure, which is described in detail as below.

Description of System Model

A UAV-based downlink wireless information and energy transmission system is considered. In this system, both the UAV and a wireless device are provided with batteries. When the UAV transmits energy to the wireless device, the wireless device stores the energy in its own battery. When the UAV transmits information to the wireless device, the wireless device uses the energy of the battery to receive a signal from UAV and decodes the signal.

Figure 2:
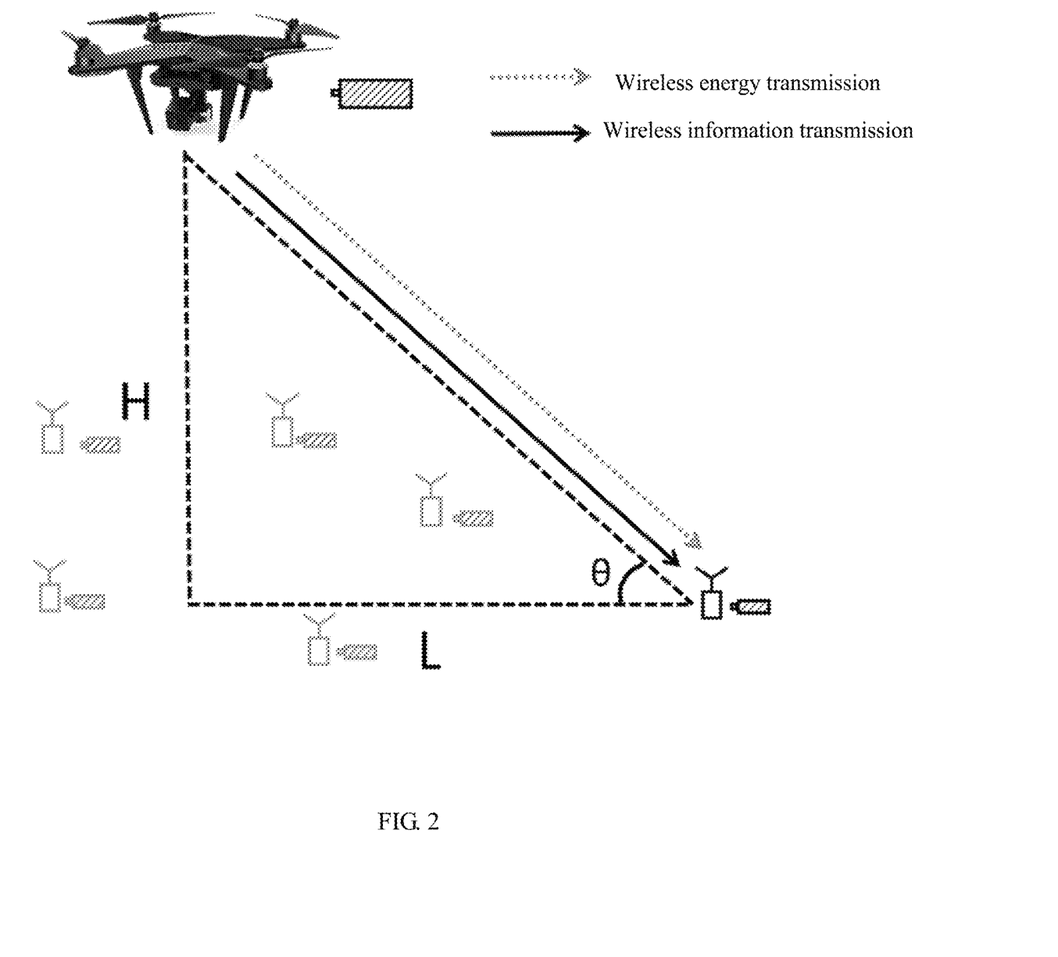
FIG. 2 is a schematic diagram of a system model according to an embodiment of the present disclosure.

As shown in FIG. 2, this model includes one UAV and a plurality of wireless devices. The UAV has limited energy, and thus in order to save energy, the UAV only adjusts its height but not moves horizontally during the whole working period. The UAV allocates a period of time and a part of energy for each wireless device to serve separately. Therefore, it is only necessary to study the process of the UAV serving a specific wireless device. The UAV serves T time slots for the wireless device. At the beginning of the $t^{th}$ time slot of the entire time slots, the wireless device reports its energy state B(t) to the UAV, and the UAV may detect a channel state γ(t) between itself and the wireless device. Next, the UAV selects to keep silence, charge the wireless device or transmit information to the wireless device according to an electric quantity of the UAV, an electric quantity of the wireless device, and the channel state. A horizontal distance and a vertical distance from the wireless device to the UAV are represented by L and H, respectively. An action of the UAV is represented by:

$$a(t) \in \left\{0\binom{\text{keep}}{\text{silence}}, 1(\text{transmit energy to the wireless device}),\right.$$
$$\left. 2(\text{transmit information to wireless device})\right\}$$

remaining service energy is represented by $E_r(t)$, and a transmission power is represented by $$P(t) = \begin{cases} 0, & a(t) = 0 \\ P_f, & a(t) = 1 \text{ or } a(t) = 2 \end{cases}, \quad (1)$$

where $P_f$ represents the operating power of the UAV. The energy required for each time decoding by the wireless device is represented by $E_d$. The system state is expressed as $S(t) \triangleq (\gamma(t) \ B(t), \ E_r(t))$, which is a Markov decision process since the system state of the current time slot is only related to the system state of a previous time slot and the action of the UAV in the previous time slot.

Channel Model

A signal transmitted from the UAV to the wireless device may be classified into a direct signal and an indirect signal according to different propagation paths. The proportion of the direct signal depends on the height and the density of surrounding buildings, the height of the UAV, and the horizontal angle between the UAV and the wireless device, etc., which is expressed by Formula $$p_L = \frac{1}{1 + a\exp(-b(\theta - a))}, \quad (2)$$

where $E_r(t)$ and b represent parameters related to the environment. θ represents the horizontal angle between the UAV and the wireless device, and is calculated as $$\theta = \frac{180}{\pi}\arctan\frac{H}{L}.$$

The proportion of the indirect signals is $p_N = 1 - p_L$. In the $t^{th}$ slot, fading of the direct signal and fading of the indirect signal are respectively as below:

$$\gamma_L(t) = |h_L(t)|^2(\sqrt{L^2 + H^2})^{-\alpha_L} \quad (3), \text{ and}$$

$$\gamma_N(t) = |h_N(t)|^2(\sqrt{L^2 + H^2})^{-\alpha_N} \quad (4),$$

where $\alpha_L$ and $\alpha_N$ represent a path fading coefficient of the direct signal and a path fading coefficient of the indirect signal, respectively. $h_L(t)$ and $h_N(t)$ respectively represent a multipath fading coefficient of the direct signal and a multipath fading coefficient of the indirect signal in the $t^{th}$ time slot, and both obey Nakagami-m distribution. In this case, a probability density distribution function of the $|h_L(t)|^2$ and a probability density distribution function of the $|h_N(t)|^2$ are as below:

$$f_{|h_L|^2}(x) = \frac{m_L^{m_L} X^{m_L - 1}}{\Omega_L^{m_L} \Gamma(m_L)} \exp\left(-\frac{m_L X}{\Omega_L}\right), \text{ and} \quad (5)$$

$$f_{|h_N|^2}(x) = \frac{m_N^{m_N} X^{m_N - 1}}{\Omega_L^{m_N} \Gamma(m_N)} \exp\left(-\frac{m_N X}{\Omega_N}\right), \quad (6)$$

where $m_L$ and $m_N$ represent a Nakagami parameter of the direct signal and a parameter of the indirect signal, respectively. $\Omega_r = E\{|h_L(t)|^2\}$ and $\Omega_N = E\{|h_N(t)|^2\}$ represent a multipath fading power of the direct signal and a multipath fading power of the indirect signal, respectively. Γ(•) represents a Gamma function. The total signal fading is expressed as $$\gamma(t) = p_L \gamma_L(t) + p_N \gamma_N(t) \quad (7).$$

State, Action and Revenue of an MDP Model

The optimal design for wireless information and energy transmission of the UAV may be modeled as a restrictive Markov decision process within limited time.

The state space of this MDP is $s=\{(\gamma(t),B(t),E_r(t)):\gamma(t)\in[0,+\infty),B(t)\in[0,B_{max}],E_r(t)\in[0,E_p]\}$. The action space is:

$$A = \left\{0\binom{\text{keep}}{\text{silence}}, 1\binom{\text{transmit energy to}}{\text{the wireless device}}, 2\binom{\text{transmit informaiton to}}{\text{the wireless device}}\right\}.$$

The revenue is an information rate, which is expressed as $$R_t(S(t), a(t)) = \log_2\left(1 + \frac{P(t)\gamma(t)}{P_0}\right)I(B(t) \geq E_d I(E_r(t) \geq P_f)I(a(t) = 2), \quad (8)$$

where $P_0$ represents a noise power, and $I(\cdot)$ represents an indicator function.

State Transition

If the UAV does not have enough energy to transmit a signal, the UAV will keep silence. Therefore, when a strategy is designed, it is only needed to consider the situation that the UAV has enough energy to transmit the signal, i.e., $E_r(t) \geq P_f$. A state transition function of the UAV and a state transition function of the wireless devices may be respectively expressed as $$B(t+1)\begin{cases} B(t), & a(t) = 0 \\ B(t) + P_f(t)\gamma(t), & a(t) = 1 \\ B(t) - E_d, & a(t) = 2 \end{cases} \quad (9)$$

$$E_r(t+1) = \begin{cases} E_r(t), & a(t) = 0 \\ E_r(t) - P_f, & a(t) = 1 \text{ or } a(t) = 2 \end{cases}, \quad (10)$$

and the $\gamma(t)$ is independently identically distribution in different t.

An Objective Function and a Restriction

The objective function is expressed as $$J(\pi) = \max_\pi \sum_{t=1}^T R_t(S(t), a(t)), \quad (11)$$

where $\pi$ represents an action strategy function, the input is $S(t)$ and the output is $a(t)$. $J(\pi)$ represents the total revenue under the strategy $\pi$. The UAV has limited energy, so the restriction of the model is $$\sum_{t=1}^T P(t) \leq E_r(1), \quad (12)$$

where $E_r(1)$ represents the total energy available for the UAV to serve the wireless device.

Action Selection Strategy

Three strategies are provided: greedy strategy, two-element control strategy, and God strategy.

Greedy Strategy

The first strategy is the simplest greedy strategy, and the action of the UAV in the $t^{th}$ time slot is $$a(t) = \begin{cases} 1, & B(t) < E_d \\ 2, & B(t) \geq E_d \end{cases}. \quad (13)$$

Two-Element Control Strategy

Because the $\gamma(t)$ and $B(t)$ are continuous, the state S is also continuous. The Markov decision process in this continuous state is particularly difficult to be decoded. Thus, a sub-optimal solution is provided.

The energy state of the wireless device is classified into a scarcity state, a medium state, and a sufficiency state, respectively corresponding to $B(t)<E_d$, $E_d \leq B(t)<(1+T-t)E_d$, and $B(t)\geq(1+T-t)E_d$. When $B(t)<E_d$, $B(t)<E_d$ the wireless device fails to decode, and the UAV does not transmit information to the wireless device. When $B(t)\geq(1+T-t)E_d$, the current electric quantity of the wireless device is enough to support decoding of all current and future time slots, and the UAV does not need to determine to charge the wireless device.

The energy state of the UAV may be likewise classified into the scarcity state, the medium state, and the sufficiency state, respectively corresponding to $P_f \leq E_r(t)<2P_f$, $2P_f \leq E_r(t)<(1+T-t)P_f$, and $E_r(t)\geq(1+T-t)P_f$. When $P_f \leq E_r(t)<2P_f$, the UAV does not determine to charge the wireless device, otherwise the UAV can do nothing but keep silence in subsequent time slots. When $E_r(t)\geq(1+T-t)P_f$, the current electric quantity of the UAV is enough to support signal transmission of all current and future time slots, and the UAV does not need to determine to keep silence.

TABLE 1 action space at current time

| B(t) | $E_r(t)$ | | |
|---|---|---|---|
| | the scarcity state | the medium state | the sufficiency state |
| the scarcity state | $a(t) \in \{0\}$ | $a(t) \in \{0, 1\}$ | $a(t) \in \{1\}$ |
| the medium state | $a(t) \in \{0, 2\}$ | $a(t) \in \{0, 1, 2\}$ | $a(t) \in \{1, 2\}$ |
| the sufficiency state | $a(t) \in \{0, 2\}$ | $a(t) \in \{0, 2\}$ | $a(t) \in \{2\}$ |

Table 1 lists the action space that the UAV needs to determine in different states. When there is more than one action in the action space, it is needed to calculate a value for each action, and then the action with the greatest value is selected. In the $t^{th}$ time slot, the value of the action is defined as $$Q_t(S(t),a(t)) \triangleq R_t(S(t),a(t))+F_t(B(t+1),E_r(t+1)) \quad (14),$$

where $F_t(B(t+1),E_r(t+1))$ represents the estimated future revenue after the time slot t. When the electric quantity of the UAV is in different states, there are different calculation methods provided for $F_t(B(t+1),E_r(t+1))$.

When the UAV is in shortage of energy, $F_t(B(t+1),E_r(t+1))$ is expressed as $$F_t(B(t+1), E_r(t+1)) \triangleq \begin{cases} V_n, a(t) = 0 \\ 0, a(t) = 2 \end{cases}, \quad (15)$$

where $V_n$ represents an expected revenue of a next time slot and is expressed as $$V_n = \log_2\left(1 + \frac{P_f E\{\gamma(t+1)\}}{P_0}\right). \quad (16)$$

When the UAV has a medium energy, it is estimated that the number of times the UAV will charge the wireless device in the future is $$n_c = \arg\min_n \left\| \left\lfloor \frac{E_r(t+1)}{P_f} \right\rfloor - n - \left\lfloor \frac{B(t+1) + nP_f E\{\gamma(t)\}}{E_d} \right\rfloor \right\|. \quad (17)$$

It is estimated that the number of times UAV will transmit information to the wireless device in the future is $$n_m = \min\left\{\left\lfloor \frac{E_r(t+1)}{P_f} \right\rfloor - n_c, \left\lfloor \frac{B(t+1) + n_c P_f E\{\gamma(t)\}}{E_d} \right\rfloor\right\}. \quad (18)$$

It is estimated that the future revenue is $$F_t(B(t+1), E_r(t+1)) \triangleq n_m \cdot \log_2\left(1 + \frac{P_f E\{\gamma(t)\}}{P_0}\right). \quad (19)$$

When the UAV has sufficient energy, it is estimated that the number of times the UAV will charge the wireless device in the future is $$n_c = \arg\min_n \left\| \lceil T - t \rceil - n - \left\lfloor \frac{B(t+1) + nP_f E\{\gamma(t)\}}{E_d} \right\rfloor \right\|. \quad (20)$$

It is estimated that the number of times UAV will transmit information to wireless devices in the future is $$n_m = \min\left\{\lceil T - t \rceil - n_c, \left\lfloor \frac{B(t+1) + n_c P_f E\{\gamma(t)\}}{E_d} \right\rfloor\right\}. \quad (21)$$

It is estimated that the future revenue is $$F_t(B(t+1), E_r(t+1)) \triangleq n_m \cdot \log_2\left(1 + \frac{P_f E\{\gamma(t)\}}{P_0}\right), \quad (22)$$

and finally the action of the $t^{th}$ time slot may be expressed as $$a(t) = \arg\max_{a_t} Q_t(S(t), a_t). \quad (23)$$

God Strategy

Because the state space is continuous, this Markov decision process is difficult to get an optimal solution in reverse. However, if all future channel states can be known in advance, the optimal solution can be obtained through forward search. This method requires the God's assistance and has a high time complexity, thus it is impossible to put this method into practical application. However, this method can be used as a benchmark for other strategies.

Figure 3:
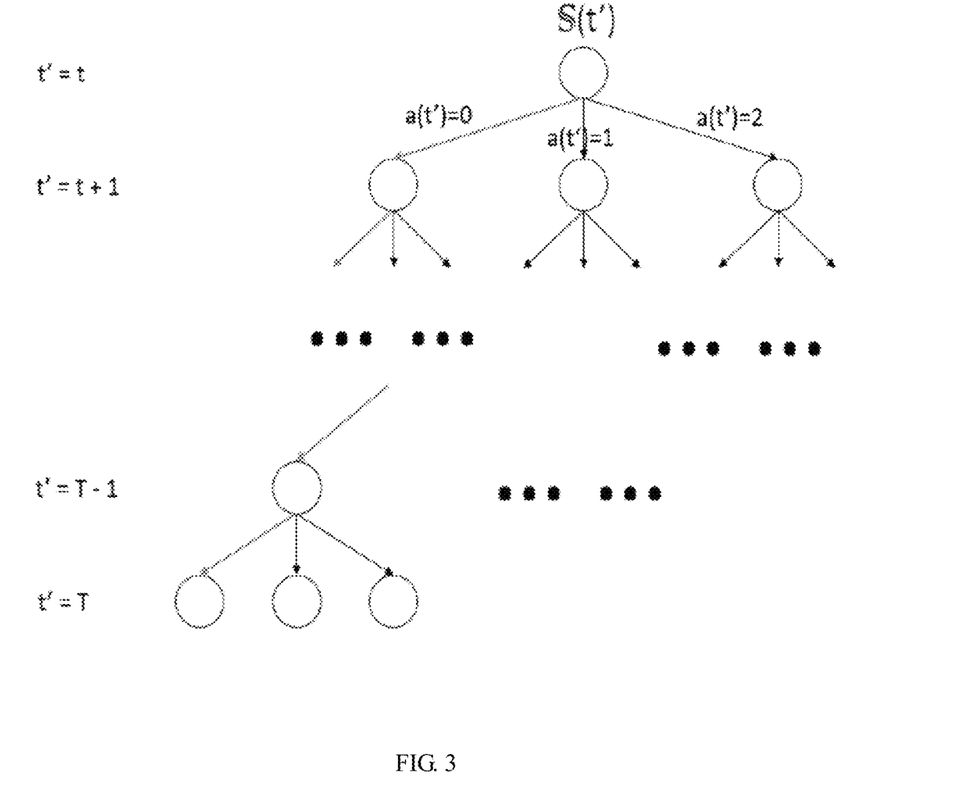
FIG. 3 is a schematic diagram of a forward algorithm for searching an optimal action according to an embodiment of the present disclosure.

As shown in FIG. 3, in the $t^{th}$ time slot, the total revenue of all action combinations from the $t^{th}$ time slot to the $T^{th}$ time slot may be calculated, and then a(t) of a path with the maximum total revenue is selected, which may be expressed as Formula $$a(t) = \arg\max_{a_t} \max_{a_{t+1},\cdots,a_T} \sum_{t'=t}^{T} R_{t'}(S(t'), a_{t'}). \quad (24)$$

The time complexity of this forward algorithm is $O(3^T)$.

Figure 4:
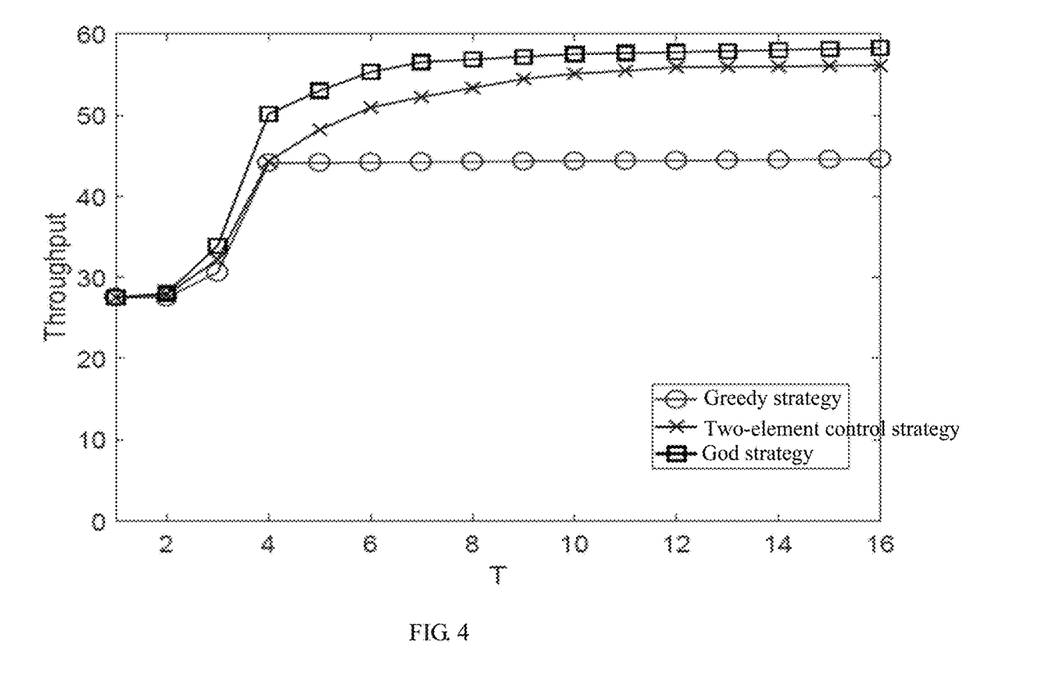
FIG. 4 is a schematic diagram showing revenue comparison of three strategies under different T according to an embodiment of the present disclosure.

Two simulation experiments are conducted: one is performance comparison of the three strategies, and the other is one-dimensional search for the optimal height of the UAV. In the first experiment, parameters are set as: L=200 m, $P_f$=100 mW, $P_0$=−100 dBm, $\Omega_L$=$\Omega_N$=12 mW, $m_L$=3, $m_N$=2, a=8.5, b=0.33, $E_d$=4 µW·s, Δt=0.1 s, $E_{total}$=40 mW·s, and B(1)=4 µW·S. The total number T of time slots is increased from 1 to 16, and for each T, 1000 rounds are conducted for each strategy and an average revenue is calculated. As shown in FIG. 4, revenues of different strategies are shown. It may be seen that the revenue of the greedy strategy and the revenue of the two-element control strategy have little difference when T is less than or equal to 4. This is because the energy of the UAV is always in the sufficiency state. As T gets closer and closer to 16, the performance of the two-element control strategy is getting better and better than that of the greedy strategy. Finally the performance of the two-element control strategy is increased by 26.05% than that of the greedy strategy, while the performance of the God strategy is only increased by 3.84% than that of the two-element control strategy.

Figure 5:
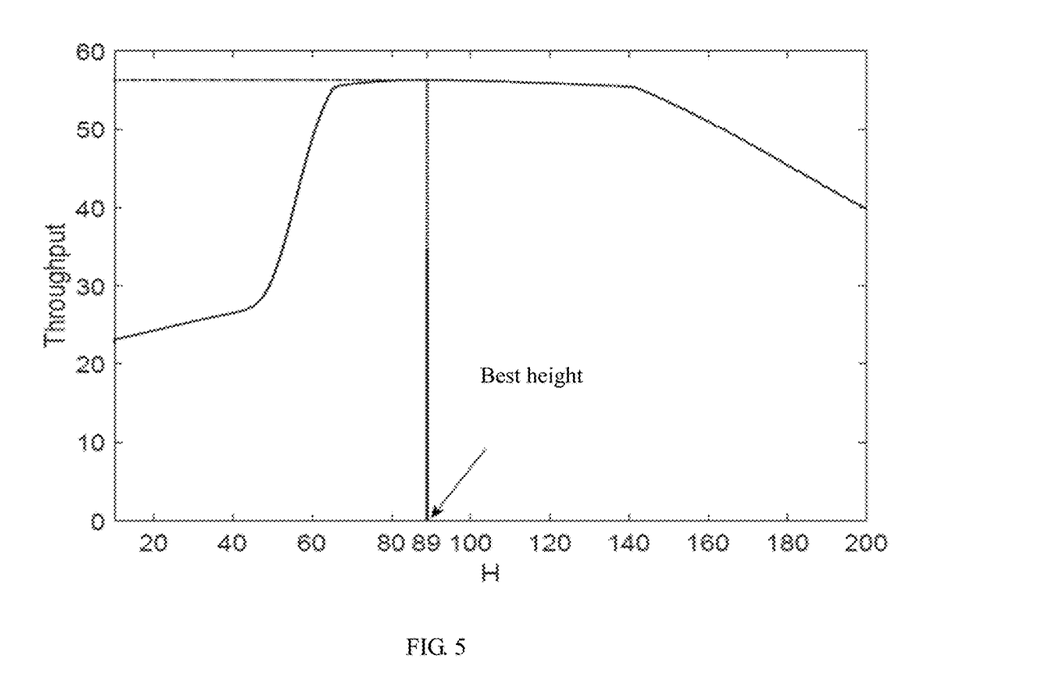
FIG. 5 is a schematic diagram showing revenue of a two-element control strategy under different heights according to an embodiment of the present disclosure.

In the second simulation experiment, the parameter is set as H=16, which is increased from 10 m to 200 m. As shown in FIG. 5, the relation between the revenue of the two-element control strategy and the height of the UAV is shown. As can be seen from FIG. 5, the best height is 89 m.

The foregoing descriptions are merely preferred embodiments of the present disclosure, and are not intended to limit the present disclosure. Any modification, equivalent replacement and improvement made within the spirit and principle of the present disclosure shall fall into the protection scope of the present disclosure.

What is claimed is:

1. An optimization method for unmanned aerial vehicle (UAV)-based wireless information and energy transmission, comprising steps of:
   S1: reporting, by a wireless device, an energy state B(t) of the wireless device to a UAV, where B(t)∈[0,$B_{max}$], where $B_{max}$ denotes a maximum energy state of the wireless device;
   S2: detecting, by the UAV, a channel state γ(t) between the UAV and the wireless device; and
   S3: selecting, by the UAV, an optimal action based on an optimal design for wireless information and energy transmission of the UAV that is based on an estimated revenue maximization according to an electric quantity of the UAV, an electric quantity of the wireless device, and the channel state;
   wherein the optimal design for wireless information and energy transmission of the UAV is modeled as a restrictive Markov decision process within limited time (MDP), a state space of the MDP is S={(γ(t), B(t), $E_r$(t)): γ(t)∈[0, +∞), B(t)∈[0, $B_{max}$], $E_r$(t)∈[0, $E_p$]}, an action space is $$A = \left\{ 0\binom{\text{keep}}{\text{silence}}, 1\binom{\text{transmit energy to}}{\text{the wireless device}}, 2\binom{\text{transmit information to}}{\text{the wireless device}} \right\},$$

the revenue is expressed as $$R_t(S(t), a(t)) = \log_2\left(1 + \frac{P(t)\gamma(t)}{P_0}\right) I(B(t) \geq E_d) I(E_r(t) \geq P_f) I(a(t) = 2),$$

a state transition function of the UAV and a state transition function of the wireless device is respectively expressed as $$B(t+1) \begin{cases} B(t), & a(t) = 0 \\ B(t) + P_f(t)\gamma(t), & a(t) = 1 \\ B(t) - E_d, & a(t) = 2 \end{cases} \text{ and}$$

$$E_r(t+1) = \begin{cases} E_r(t), & a(t) = 0 \\ E_r(t) - P_f, & a(t) = 1 \text{ or } a(t) = 2, \end{cases}$$

an objective function is expressed as $$J(\pi) = \max_{\pi} \sum_{t=1}^{T} R_t(S(t), a(t)),$$

where π represents an action strategy function, input is S(t) and output is a(t), J(π) represents a total revenue under a strategy π, $E_r$(t) represents a remaining service energy of the UAV, $P_0$ represents a noise power, I(•) represents an indicator function, P(t) represents an operating power of the UAV in time slot t, γ(t) represents independently identically distribution in time slot t, γ(t) represents a total signal fading, $E_d$ represents the energy required by the wireless device for each time decoding, $E_p$ represents a maximum value of the remaining service energy of the UAV, a(t) represents each action of the time slot t, T represents the UAV serves T time slots for the wireless device, $P_f$ represents a transmission power of the UAV, $R_t$ represents an instantaneous revenue of the time slot t.

2. The optimization method according to claim 1, wherein the energy state B(t) of the wireless device is classified into a first scarcity state, a first medium state, and a first sufficiency state, respectively, the first scarcity state corresponding to B(t)<$E_d$, the first medium state corresponds to $E_d$≤B(t)<(1+T−t)$E_d$, and the first sufficiency state corresponds to B(t)≥(1+T−t)$E_d$; when B(t)<$E_d$, the wireless device fails to decode, and the UAV does not transmit the information to the wireless device; and when B(t)≥(1+T−t)$E_d$, a current electric quantity of the wireless device is enough to support decoding of all current and future time slots, and the UAV does not need to determine to charge the wireless device.

3. The optimization method according to claim 2, wherein an energy state of the UAV is classified into a second scarcity state, a second medium state, and a second sufficiency state, respectively, the second scarcity state corresponds to $P_f$≤$E_r$(t)<2$P_f$, the second medium state corresponds to 2$P_f$≤$E_r$(t)<(1+T−t)$P_f$, and the second sufficiency state corresponds to $E_r$(t)≥(1+T−t)$P_f$; when $P_f$≤$E_r$(t)<2$P_f$, the UAV does not determine to charge the wireless device, and when $E_r$(t)≥(1+T−t)$P_f$, a current electric quantity of the UAV is enough to support information transmission in all current and future time slots, and the UAV does not need to determine to keep silence.

4. The optimization method according to claim 3, wherein the UAV needs to determine the action space in different states, and when there is more than one action in the action space, a value needs to be calculated for each action of the more than one action, an action with a maximum value is selected, and the value of the each action is defined as $Q_t$(S(t),a(t))≜$R_t$(S(t), a(t))+$F_t$(B(t+1), $E_r$(t+1)); $F_t$(B(t+1), $E_r$(t+1)) represents an estimated future revenue after a time slot t; $Q_t$ represents a total revenue of an instantaneous revenue plus the estimated future revenue corresponding to the each action a(t) in a state S(t), S(t) represents a system state of the time slot t, a(t) represents the each action of the time slot t, and $R_t$ represents the instantaneous revenue of the time slot t.

5. The optimization method according to claim 4, wherein when the electric quantity of the UAV is in different states, there are different calculation methods for the estimated future revenue, and the each action of the time slot of the UAV is expressed as $$a(t) = \arg\max_{a_t} Q_t(S(t), a(t)).$$

6. The optimization method according to claim 5, wherein when the UAV is in shortage of energy, $$F_t(B(t+1), E_r(t+1)) \triangleq \begin{cases} V_n, & a(t) = 0 \\ 0, & a(t) = 2 \end{cases},$$

wherein $V_n$ represents an expected revenue of a next time slot and is expressed as $$V_n = \log_2\left(1 + \frac{P_f E\{\gamma(t+1)\}}{P_0}\right);$$

$P_f$ represents a transmission power of the UAV, E represents a mathematical expectation symbol, γ represents the channel state, and $P_0$ represents a noise power.

7. The optimization method according to claim 6, wherein when the UAV has a medium energy, a number of times the UAV charges the wireless device in a future is estimated as $$n_c = \arg\min_n \left\| \left\lceil \frac{E_r(t+1)}{P_f} \right\rceil - n - \left\lfloor \frac{B(t+1) + nP_f E\{\gamma(t)\}}{E_d} \right\rfloor \right\|,$$

a number of times the UAV transmits information to the wireless device in the future is estimated as $$n_m = \min\left\{ \left\lceil \frac{E_r(t+1)}{P_f} \right\rceil - n_c, \left\lfloor \frac{B(t+1) + n_c P_f E\{\gamma(t)\}}{E_d} \right\rfloor \right\},$$

and the estimated future revenue is expressed as $$F_t(B(t+1), E_r(t+1)) \triangleq n_m \cdot \log_2\left(1 + \frac{P_f E\{\gamma(t)\}}{P_0}\right).$$

8. The optimization method according to claim 7, wherein when the UAV has sufficient energy, the number of times the UAV charges the wireless device in the future is estimated as $$n_c = \arg\min_n \left\| \lceil T - t \rceil - n - \left\lfloor \frac{B(t+1) + nP_f E\{\gamma(t)\}}{E_d} \right\rfloor \right\|,$$

the number of times the UAV transmits information to the wireless device is estimated as $$n_m = \min\left\{ \lceil T - t \rceil - n_c, \left\lfloor \frac{B(t+1) + n_c P_f E\{\gamma(t)\}}{E_d} \right\rfloor \right\},$$

and the estimated future revenue is expressed as $$F_t(B(t+1), E_r(t+1)) \triangleq n_m \cdot \log_2\left(1 + \frac{P_f E\{\gamma(t)\}}{P_0}\right),$$

where n is a variable representing the number of times that the UAV performs wireless energy transfer.

9. The optimization method according to claim 8, wherein a signal transmitted from the UAV to the wireless device is classified into a direct signal and an indirect signal according to different propagation paths.

* * * * *